United States Patent
Boute et al.

(10) Patent No.: US 7,806,533 B2
(45) Date of Patent: Oct. 5, 2010

(54) OPTICAL SYSTEM ALTERNATING IMAGE CAPTURE AND IMAGE PROJECTION

(75) Inventors: Olivier Boute, Paris (FR); Olivier Gachignard, Montrouge (FR)

(73) Assignee: France Telecom, Paris (FR)

( * ) Notice: Subject to any disclaimer, the term of this patent is extended or adjusted under 35 U.S.C. 154(b) by 484 days.

(21) Appl. No.: 11/818,877

(22) Filed: Jun. 15, 2007

(65) Prior Publication Data

US 2008/0013050 A1  Jan. 17, 2008

(30) Foreign Application Priority Data

Jun. 20, 2006  (FR) .................................. 06 52543

(51) Int. Cl.
*G03B 21/28* (2006.01)

(52) U.S. Cl. .............................. 353/98; 353/21; 353/28; 353/30; 353/97; 348/14.01; 348/14.02; 348/14.03; 348/14.04; 348/14.05; 348/14.06; 348/14.07; 348/14.08; 348/14.09; 348/14.11; 348/14.12; 348/14.13; 348/14.14; 348/14.15; 348/14.16; 359/630; 359/631; 359/632; 359/633

(58) Field of Classification Search ................... 353/21, 353/28, 30, 97, 98; 348/14.01, 14.03, 14.07, 348/14.08, 14.09, 42, 49, 52, 54, 55, 56, 348/57, 61, 14.1, 14.11, 14.12, 14.13, 14.14, 348/14.15, 14.16; 359/630, 631, 632, 633
See application file for complete search history.

(56) References Cited

U.S. PATENT DOCUMENTS

| | | | |
|---|---|---|---|
| 4,671,625 A | | 6/1987 | Noble |
| 4,890,314 A | * | 12/1989 | Judd et al. ................ 348/14.01 |
| 5,782,547 A | | 7/1998 | Machtig et al. |
| 5,890,787 A | * | 4/1999 | McNelley et al. ............. 353/28 |
| 6,104,424 A | | 8/2000 | McNelley |
| 6,943,818 B2 | * | 9/2005 | Buchner et al. .......... 348/14.01 |
| 7,136,090 B1 | * | 11/2006 | McDuffie White ....... 348/14.16 |
| 7,158,952 B1 | * | 1/2007 | Grossi et al. ................... 705/43 |
| 7,236,301 B2 | * | 6/2007 | Huber ......................... 359/501 |
| 7,336,294 B2 | * | 2/2008 | Kjesbu et al. ............ 348/14.16 |
| 7,434,937 B2 | * | 10/2008 | Chung .......................... 353/70 |

(Continued)

FOREIGN PATENT DOCUMENTS

CN  1258611 C  6/2006

(Continued)

*Primary Examiner*—Georgia Y Epps
*Assistant Examiner*—Sultan Chowdhury
(74) *Attorney, Agent, or Firm*—Lawrence E. Laubscher, Sr.; Lawrence E. Laubscher, Jr.

(57) ABSTRACT

An optical system comprises a first image capture device for capturing an image of an observation area, a first display device, a semi-reflecting plate, a concave mirror disposed facing the first display device, and a second display device for displaying a background image. A light beam is scattered by the first display device through the semi-reflecting plate and then reflected by the mirror and the semi-reflecting plate in order to display an aerial image between the semi-reflecting plate and the observation area. A projector projects a light beam toward one of the display devices. The first image capture device is adapted to capture the image of the observation area via said one display device. A alternating control device alternates capture of an image of the observation area by the first image capture device and projection of the light beam projected by the projector.

12 Claims, 11 Drawing Sheets

U.S. PATENT DOCUMENTS

| | | | |
|---|---|---|---|
| 7,760,229 B2 * | 7/2010 | White | 348/14.16 |
| 2001/0055152 A1 | 12/2001 | Richards | |
| 2003/0174292 A1 * | 9/2003 | White | 353/74 |
| 2004/0165060 A1 | 8/2004 | McNelley et al. | |
| 2005/0111101 A1 | 5/2005 | Dike | |
| 2006/0203363 A1 | 9/2006 | Levy-Rosenthal | |

FOREIGN PATENT DOCUMENTS

| | | | |
|---|---|---|---|
| EP | 0310077 | A2 | 4/1989 |
| WO | WO 95/19584 | | 7/1995 |
| WO | 9818114 | A1 | 4/1998 |
| WO | WO 00/65844 | | 11/2000 |
| WO | WO 01/11880 | A1 | 2/2001 |
| WO | 0157591 | A1 | 8/2001 |
| WO | 02061492 | A1 | 8/2002 |

\* cited by examiner

OPTICAL SYSTEM ALTERNATING IMAGE CAPTURE AND IMAGE PROJECTION

REFERENCE TO RELATED APPLICATION

The present application is based on, and claims priority from, French Application Number 0652543, filed Jun. 6, 2006, the disclosure of which is hereby incorporated by reference herein in its entirety.

BACKGROUND OF THE INVENTION

1. Field of the Invention

The present invention relates to an optical system alternating image capture of a local scene in which the optical system is located and projection of an aerial image by reflection in the optical system, for real time applications such as videoconferences, multimedia or virtual reality.

2. Description of the Prior Art

An aerial image is perceived in a stable and unique plane in space. When it is perceived in that space, the aerial image reproduces in its entirety and with high definition an image of an object via an optical system. In geometrical optics, an aerial image means a real image that is not formed on a screen.

In the prior art, communication installations linking two optical systems employ the generation of aerial images by reflection in order to produce a stereoscopic effect resulting from the perception by an observer of two images superposed on two planes in space via a semi-reflecting plate. The semi-reflecting plate enables a camera to capture an image in the direction of the observer and also enables the observer to view an image by reflection in that same direction. One such communication installation is described in the international patent application WO 01/11880.

These communication installations use the concepts of a "client station" intended for a group of persons and an individual "operator station" to extract the image of an object under particular shooting conditions. A monochrome background behind the object generally facilitates extraction of the image of the object from the operator station and the extracted image of the object is transmitted to the client station, which displays an aerial image of the viewed object for the group of persons. An image captured by the client station is transmitted to the operator station, which displays only the captured image and not the extracted image of the object. The camera is disposed between the semi-reflecting plate and the background of the scene. The camera is therefore not hidden by any device and always remains visible to the observer.

These communication installations are therefore asymmetrical because the functions of the client station and the operator station are different.

Moreover, each optical system is bulky and necessitates a spacious place for its installation.

Figure 1:
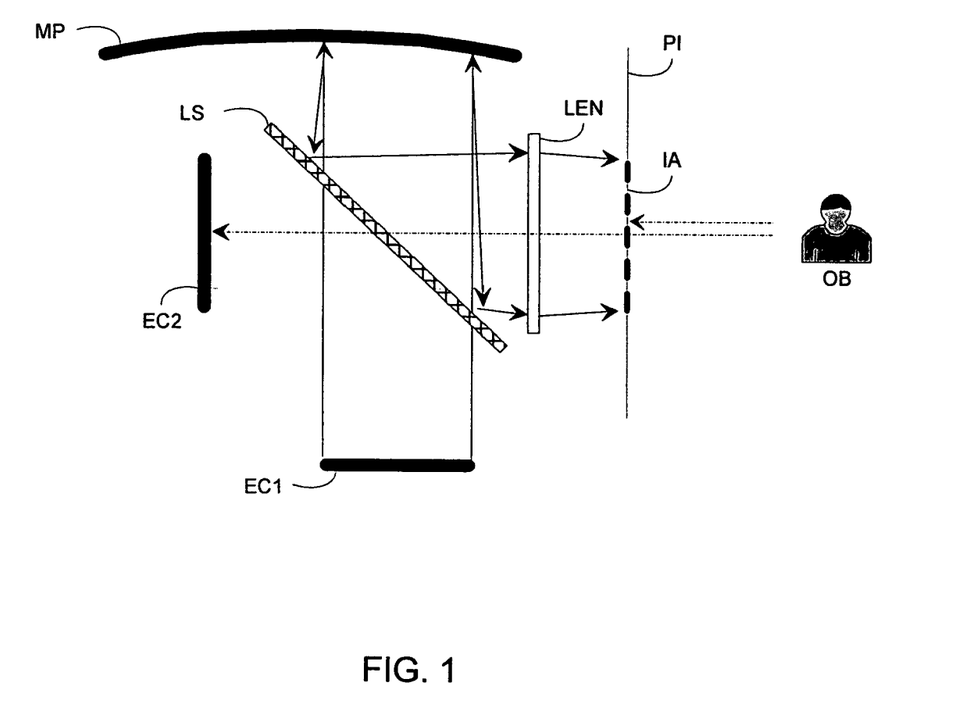

FIG. 1 illustrates an optical system for aerial image generation by reflection. The system comprises a parabolic mirror MP, a first screen EC1, for example of the cathode ray tube screen type, and a semi-reflecting plate LS adapted to transfer an image of an object coming from the first screen EC1 to a plane PI in space, in the direction of an observer OB, via a lens LEN. The lens is adapted to cause a light beam coming from the first screen EC1 to converge to form a high-definition aerial image IA in the plane PI of the space.

The effect of the aerial image IA perceived in the plane PI by the observer OB floating is accentuated by the display of a second image representing a background scene on a second screen EC2 located in the background.

This kind of optical system does not provide observer image capture and therefore cannot be used for real time applications such as videoconferences.

SUMMARY OF THE INVENTION

To remedy the aforementioned drawbacks, an optical system according to the invention comprising a first image capture device for capturing an image of an observation area, a first display device, a semi-reflecting plate, a concave mirror disposed facing the first display device, and a second display device for displaying a background image, a light beam being scattered by the first display device through the semi-reflecting plate and then reflected by the mirror and the semi-reflecting plate in order to display an aerial image between the semi-reflecting plate and the observation area, is characterized in that it comprises:

a projector adapted to project a light beam toward one of the display devices, the first image capture device being adapted to capture the image of the observation area through said one display device, and means for alternating capture of the image of the observation area by the first image capture device and projection of the light beam projected by the projector.

The position of the first image capture device behind one of the display devices makes the optical system compact and modular and it can therefore be installed without unacceptable volume constraints.

Moreover, the projected aerial image appears between the semi-reflecting plate and the observation area in a plane of the space parallel to the plane of the background image displayed on the second display device. The superposition of the projected image and displayed image creates a perspective effect.

The alternating means alternate image capture and display sufficiently quickly for the eye of an observer in the observation area to observe images continuously.

Thanks to the alternating means, first and second optical systems according to the invention can communicate in order for an observer in front of the first system to observe an aerial image of an observer in front of the second system and viceversa, for example during an exchange of images in real time during a videoconference.

According to one feature of the invention, the first image capture device may be located behind the first display device near a focus of the concave mirror and can form with the mirror and the semi-reflecting plate a telecentric optical assembly the field of view whereof is cylindrical in the direction of the aerial image and the observation area.

A cylindrical light beam coming from the observation area is reflected successively by the semi-reflecting plate and then by the concave mirror to converge in conical form at the focus of the concave mirror at which the first image capture device is located. The latter has a conical field of view that is centered on the focus of the concave mirror and that corresponds to the conical light beam converging at the focus. Consequently, the concave mirror confers a cylindrical field of view on the first image capture device by reflecting the cylindrical light beam as a conical light beam.

Moreover, an optical system is referred to as "telecentric" when it displays images of objects at constant size independently of their distance from the optical system, which eliminates all distortion of the perspective of the images around the center of the field of view of the optical system. In particular, a telecentric optical system has a cylindrical field of view in order for the size of the observed objects to be constant, independently of their distance from the optical system.

Placing the first image capture device near a focus of the concave mirror authorizes telecentric shooting of the observation area. The first image capture device then captures a clear image however far away the observation area may be, the field of view of the device being cylindrical.

According to another feature of the invention, the optical system further comprises a second image capture device located behind the second display device, the first image capture device being located behind the first display device in the vicinity of a focus of the concave mirror.

The first image capture device located in the vicinity of a focus of the concave mirror has a cylindrical field of view authorizing telecentric shooting of the observation area while the second image capture device captures an image of the observation area superposed on the aerial image projected with a conical field of view in order to localize the overall position of the observation area.

The alternating means can control the projector and one of the display devices alternately. The alternating means then control one of the display devices to assume an opaque state and projection of the light beam by the projector onto said one display device, and control said one display device to assume a transparent state and suppression of the light beam in order for the first image capture device to capture an image of the observation area.

According to another embodiment of the invention, the optical system comprises a shutter, for example a rotary shutter, controlled by the alternating means. The shutter has at least one aperture portion, through which the light beam projected by the projector passes toward said display device, behind which the first image capture device is located to display one of the aerial image and background image with no image capture of the observation area, and at least one solid portion blocking the projected light beam to capture an image of the observation area.

The speed at which the shutter moves, for example its rotation speed, is accurately controlled by the alternating means.

According to a further embodiment of the invention, the optical system comprises a mobile flap placed in the vicinity of the projector and of one of the first and second display devices and controlled by the alternating means. The mobile flap includes an orifice through which the light beam projected by the projector can pass toward the other of the first and second display devices to display one of the aerial and background images and a reflecting surface adapted to reflect the projected light beam to back-project it onto one of the first and second display devices that is displaying the other of the aerial and background images.

BRIEF DESCRIPTION OF THE DRAWINGS

Other features and advantages of the present invention will become more clearly apparent on reading the following description of embodiments of the invention given by way of nonlimiting example, with reference to the corresponding appended drawings, in which:

FIG. 1 is a diagrammatic side view of an aerial image generation system belonging to the prior art of the invention, already commented on;

DESCRIPTION OF EMBODIMENTS

Figure 2:
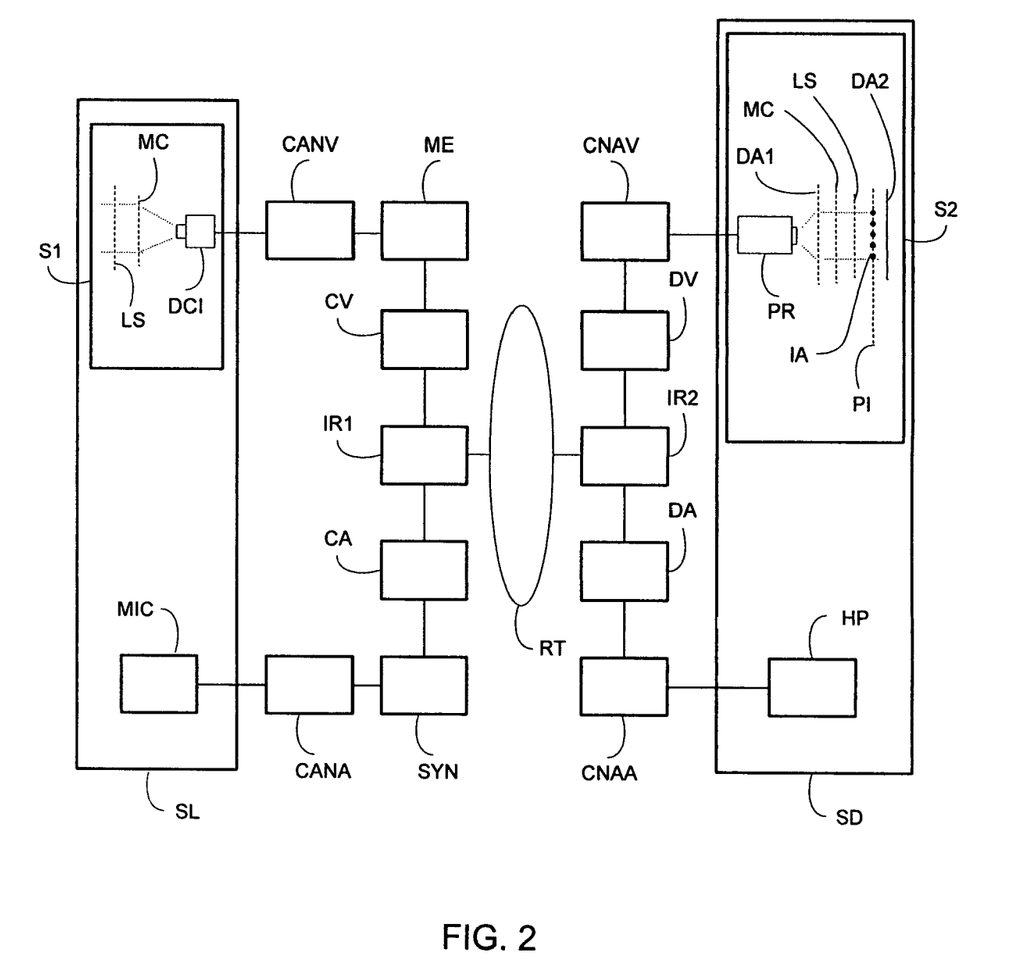
FIG. 2 is a block diagram of a dual communication system comprising two optical systems.

Referring to FIG. 2, two optical systems S1 and S2 are connected via a telecommunication network RT to form what is known as a dual communication system. An optical system S1, S2 is represented in more detail in FIG. 3A or 3B in particular.

The system S1 is located in a local scene SL and comprises an image capture device DCI for example located in the region of a focus of a concave mirror MC and a semi-reflecting plate LS in order to capture an image of the local scene SL.

The captured image is for example processed by a video analog-to-digital converter CANV and then by an extraction module ME to extract a portion of the captured image, for example images of objects in the local scene SL. The extracted image portion is then transmitted to a video coder CV which compresses the extracted image portion to produce a compressed image portion that is thereafter transmitted over the network RT via a network interface IR1.

Sound from the local scene SL is captured by a microphone MIC connected to an audio analog-to-digital converter CANA that transmits the captured sound to a synchronizer SYN to synchronize the captured sound with the captured image. The synchronized sound is then coded by an audio coder CA before being transmitted over the network RT via the interface IR1.

The coded sound and image are then transmitted to the system S2 located in a remote scene SD via a network interface IR2.

The coded sound is decoded by an audio decoder DA and processed by an audio digital-to-analog converter CNAA before being transmitted to a loudspeaker HP located in the remote scene SD. The coded image is decoded by a video decoder DV and processed by a video digital-to-analog converter CNAV before being transmitted to the system S2.

The system S2 comprises a projector PR for projecting an aerial image IA in a plane PI of the space in the local scene SL, the aerial image representing the extracted portion of the image captured by the system S1. The system S2 comprises a concave mirror MC and a semi-reflecting plate LS and a first display device DA1 associated with the projector PR for projecting the aerial image IA. The system S2 further comprises a second display device DA2 for displaying a background image.

The two optical systems capture and exchange images of the local and remote scenes. The aerial image IA formed in the plane PI is then the image of the local scene captured and transmitted by the system S1 to the system S2. Because the two systems form a dual communication system, the system S2 has functional means similar to those of the system S1 described above, and vice-versa. Consequently, an observer located in the remote or local scene can observe an aerial image that is an image of the local or remote scene representing in particular another observer, the observers communicating with each other during a videoconference, for example.

Figure 3A:
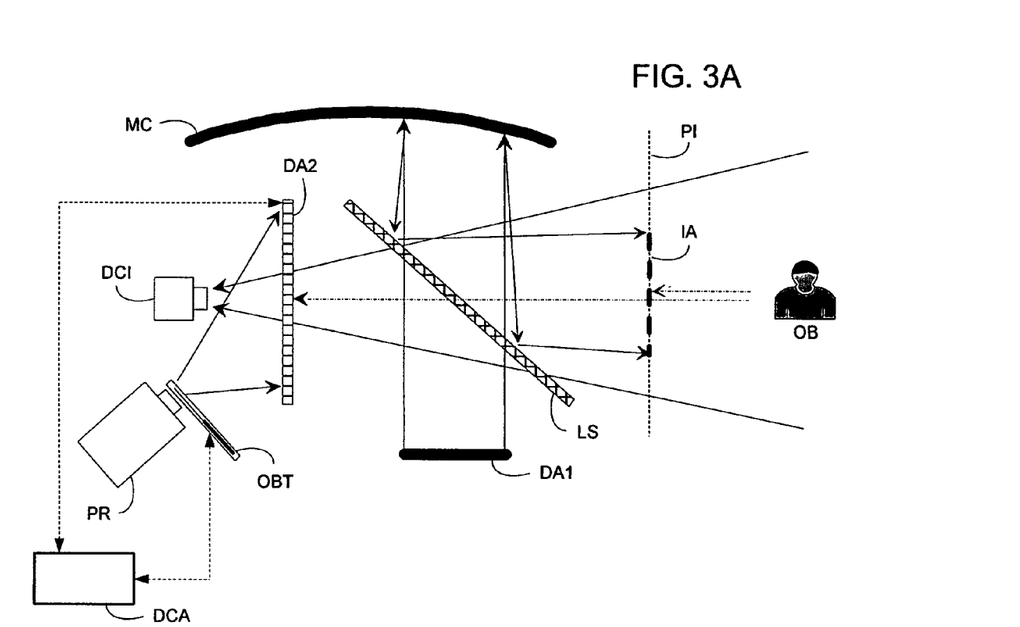
FIGS. 3A and 3B are diagrammatic side views of an optical system according to two variants of a first embodiment of the invention.
Figure 3B:
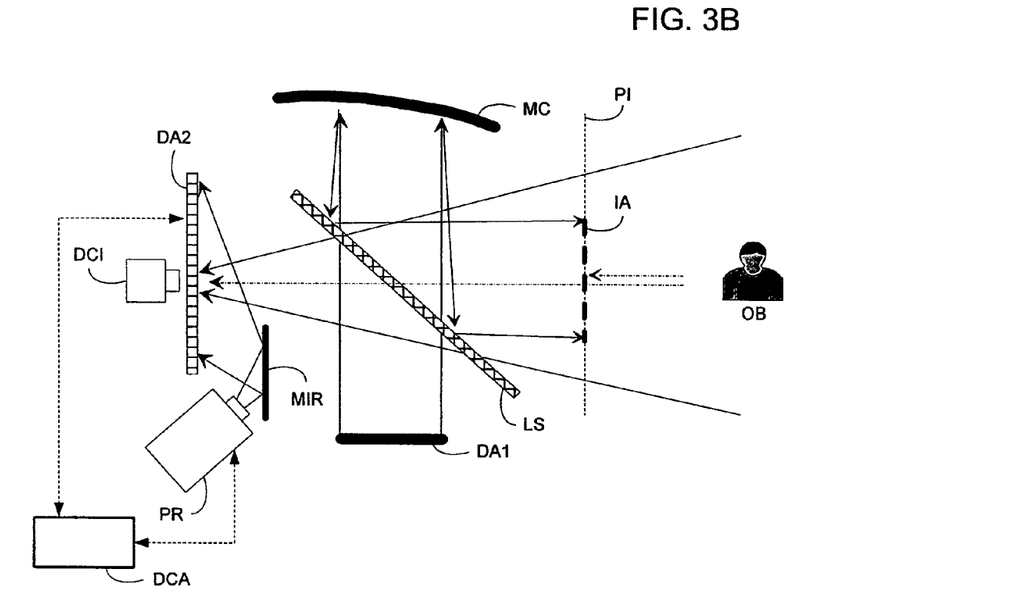

In a first embodiment of the invention shown in FIGS. 3A and 3B, an optical system comprises a first image capture device DCI, a first display device DA1, a second display device DA2, a concave mirror MC, a semi-reflecting plate LS, a projector PR, and an alternating electronic control device DCA. The optical system faces an observation area referred to as the local scene in which at least one observer OB is located facing the second display device DA2.

Beforehand, the geometrical centers of the display devices DA1 and DA2, the semi-reflecting plate LS and the concave mirror MC are positioned so that they are substantially coplanar.

The concave mirror MC has a paraboloidal or partly paraboloidal shape, for example, having one or plural main and secondary foci.

The semi-reflecting plate LS is a rectangular glass plate, for example. A semi-reflecting face of the plate is positioned in a bisector plane with two substantially perpendicular and concurrent optical axes, one being vertical, for example, and that of the display device DA1 passing through the center of the display surface of the latter and the other being horizontal and that of the display device DA2 passing through the center of the display surface of the latter. The plate is centered on the optical axes and is inclined at substantially 45° to the optical axes. The display devices DA1 and DA2 are therefore disposed perpendicularly to each other, for example horizontally and vertically, respectively.

The first display device DA1 scatters a light beam through the semi-reflecting plate LS toward the concave mirror MC in order to project an aerial image IA in the direction of the observation area in which the observer OB is located. The light beam is reflected successively by the concave mirror MC and then by the semi-reflecting plate LS in order to project an aerial image into a plane PI in the space in the local scene.

The aerial image IA is represented in thick chain-dotted line in FIGS. 3A and 3B. The plane PI corresponds to a foreground plane parallel to the display surface of the second display device DA2 displaying a background image in the background plane. The clearly apparent aerial image IA formed in the plane PI is an image of the plane of the display surface of the first display device DA1 symmetrical about the semi-reflecting plate LS. In other words, the aerial image IA is the conjugate image of a real object corresponding to an image formed on the display surface of the second display device DA2 with respect to the optical assembly consisting of the concave mirror and the semi-reflecting plate. The aerial image IA is in reality displayed on the plate LS, but as a result of an optical illusion is clearly apparent to the observer OB in the plane PI and seems to "float" in the air. The superposition of the background image and the aerial image then produces a perspective effect.

The image capture device DCI captures images of the local scene and in particular of the observer OB facing the second display device DA2. The image capture device is a digital still camera, a digital video camera or a camcorder, for example. The digital images can form a video sequence captured by a video camera or a camcorder, for example.

The display devices DA1 and DA2 comprise for example semi-transparent screens onto which an image can be projected and through which a light beam can be propagated. Each display device then has an image display state and a transparent state.

For example, the display surface of a display device is a plasma panel controlled by voltage variations, like those used in flat plasma screens. In another example, the display surface is a voltage-controlled liquid crystal panel as used in flat liquid crystal display (LCD) screens.

According to another example, at least one of the display devices is of translucent type and comprises a laminated screen consisting of two sheets of glass between which a liquid crystal film is placed. The two faces of the liquid crystal film are covered by an electrically conductive transparent layer. The laminated screen controlled by an electrical signal therefore passes from an image display state that corresponds to a translucent or frosted state of the screen for which the liquid crystals are disordered to a transparent state for which the liquid crystals are aligned.

According to a further example, one of the display devices comprises a display surface of transreflective type, containing an antireflection glass panel to which a plastic film is bonded. The plastic film features protuberances that reflect a light beam only if it is at a predetermined angle of incidence. For other angles of incidence the plastic film allows the light to pass on both sides.

One of the display devices can be a cathode ray tube screen.

As shown in FIGS. 3A and 3B, the image capture device DCI is located behind the second display device DA2 relative to the observer OB and captures images of the local scene and in particular of the observer. The image capture device DCI has an optical axis that coincides with an observation optical axis and is oriented in the direction of the projection of the aerial image IA in front of the observer and has a conical field of view in the direction of the local scene and the observer.

The projector PR is generally associated with one of the display devices DA1 and DA2 to project images. For example, the projector projects a background image, for example a prestored image, on the rear face of the second display device DA2, as shown in FIGS. 3A and 3B. According to another example shown in FIGS. 4A and 4B, the projector PR projects a source image of an object corresponding to the aerial image IA on the front face of the first display device DA1. The source image corresponding to the aerial image IA represents for example the extracted portion of the image captured by a remote optical system and including the silhouette of an observer. The display device DA1 then scatters a light beam through the semi-reflecting plate LS that is reflected by the concave mirror MC and then by the semi-reflecting plate LS to form the aerial image IA in the direction of the observer OB.

As shown in FIG. 3A, the background image is directly projected at a predetermined incidence by the projector PR onto the second display device DA2, which has a translucent type display surface, for example. The image capture device DCI is then placed at a sufficient distance from the second display device DA2 not to block the projection of the background image.

As shown in FIG. 3B, the projector PR is moved close to the first display device DA1 and under the second display device DA2. A plane mirror MIR placed between the projector PR and the first display device DA1 reflects the light beam emitted by the projector PR to project the light beam back onto the front face of the second display device DA2 and thus form the background image thereon. The image capture device DCI is then moved close to the rear face of the second display device DA2. In this variant, the confined disposition of the display devices and the projector reduces the overall size of the optical system.

Figure 4A:
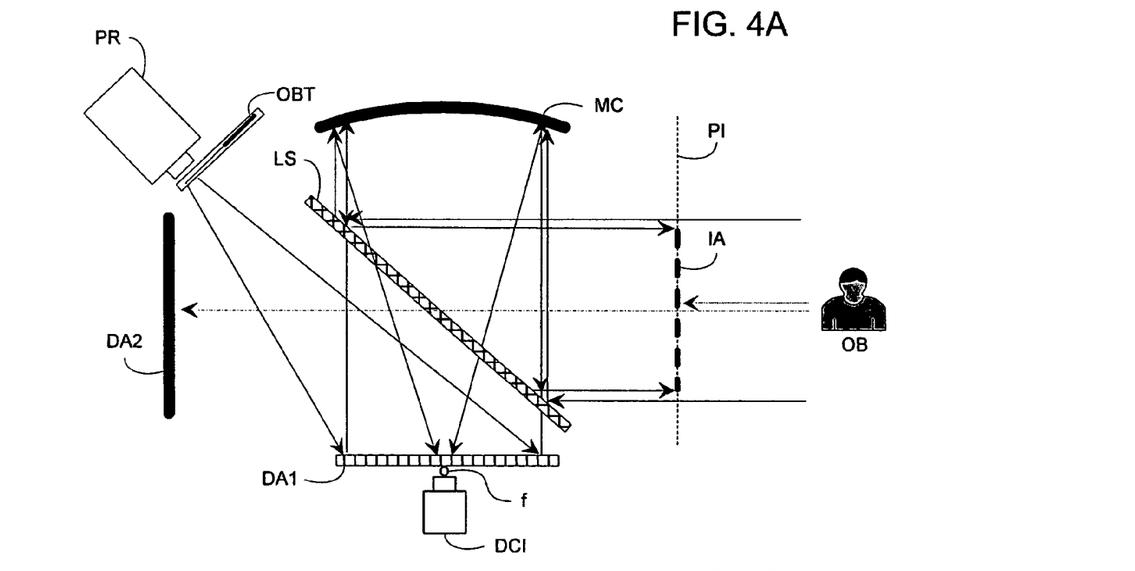
FIGS. 4A and 4B are diagrammatic side views of an optical system according to two variants of a second embodiment of the invention.
Figure 4B:
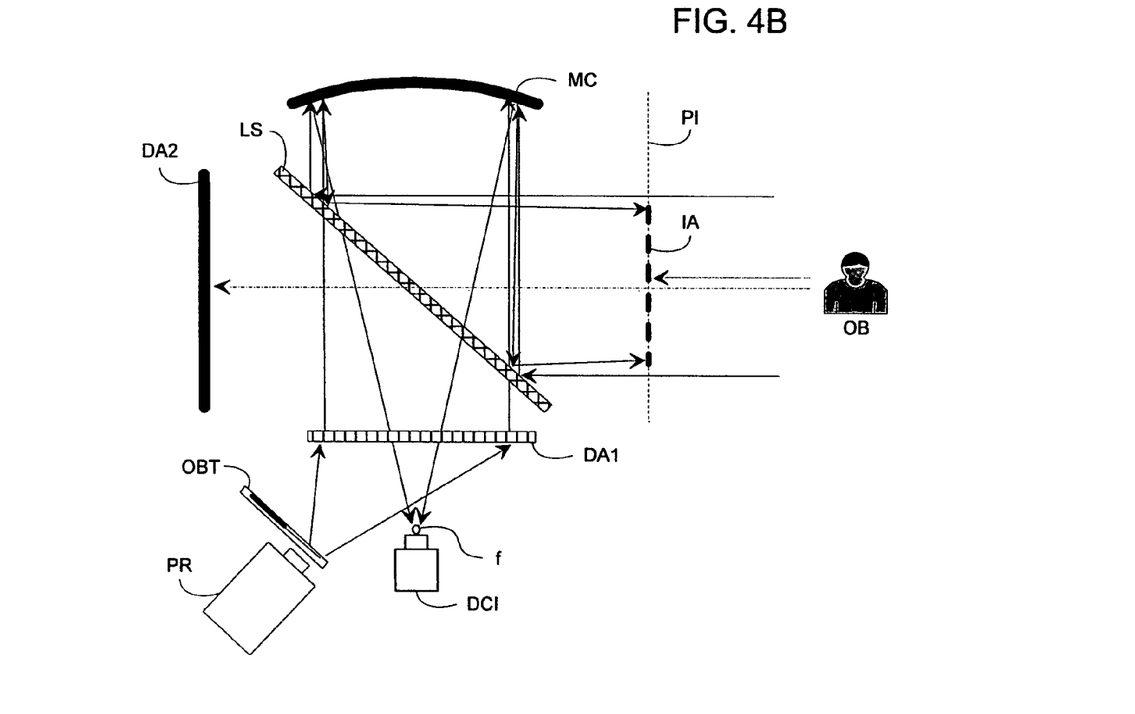

The alternating electronic control device DCA alternately controls capture of the image of the local scene by the image capture device DCI and emission of the light beam by the projector PR to display the background image as in FIG. 3A or 3B or the aerial image IA as in FIG. 4A or 4B.

According to FIG. 3A, the alternating control device DCA controls the electric motor of a shutter OBT having apertured portions in front of the projector as described in more detail hereinafter with reference to FIGS. 6A to 6D and 7A to 7D, in order alternately to block a light beam emitted by the projector and to allow it to pass. According to FIG. 3B, the alternating control device DCA alternately transmits an image signal to the projector and does not transmit an image signal to the projector in order for the latter alternately to project a light beam and not to project a light beam.

Figure 5:
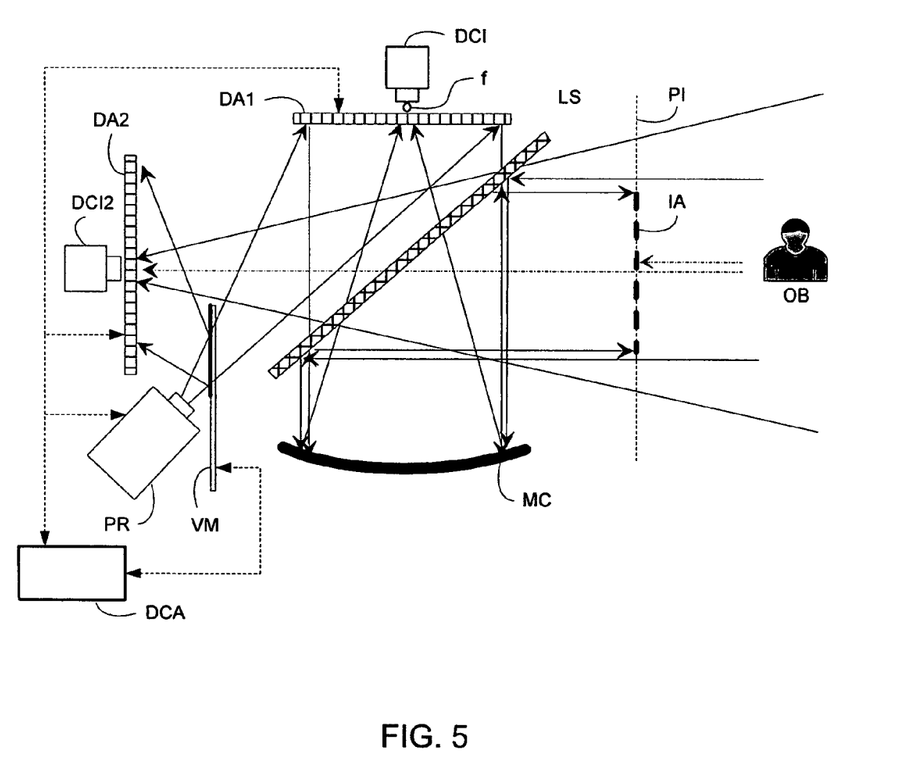
FIG. 5 is a diagrammatic side view of an optical system according to a third embodiment of the invention.

In the embodiment shown in FIG. 5, the alternating control device DCA is connected to the projector PR so that the latter projects alternately an aerial image and a background image.

The alternating control device DCA is further connected to at least one of the display devices DA1 and DA2, for example to control the translucent type display device to assume alternately the opaque state and the transparent state.

In all cases, the image capture device DCI is disposed behind one of the display devices DA1 and DA2 onto which a light beam is projected to display the background image or the aerial image. The alternating control device DCA coordinates the projection of the light beam by the projector onto said one display device and the opaque state of said one display device to display the required image, and controls said one display device to assume the transparent state and the suppression of the light beam when no light beam is projected for image capture by the device DCI.

However, the image capture device DCI may capture images continuously, in which case only one image in two is processed.

To avoid overloading the other figures, the alternating control device DCA is represented only in FIGS. 3A, 3B, 5 and 7D.

According to a second embodiment of the invention shown in FIGS. 4A and 4B, the first image capture device DCI is located near a focus f of the concave mirror MC. The device DCI, the mirror MC and the semi-reflecting plate LS form a telecentric optical assembly with a cylindrical field of view in the direction of the local scene and the observer OB. The image capture device DCI is then disposed behind and near the first display device DA1.

As shown in FIG. 4A, the projector PR is disposed between the second display device DA2 and the concave mirror MC and laterally with respect to an edge of the semi-reflecting plate LS opposite the display device DA1. The projector PR projects the source image corresponding to the aerial image IA onto the front face of the display device DA1 along a projection axis substantially parallel to the plane of the semi-reflecting plate LS. The display device DA1, which has a translucent type display surface, for example, reflects the light beam produced by the projector PR and scatters it through the plate LS. The light beam is then reflected successively by the concave mirror MC and then by the plate LS to form the aerial image IA in the plane PI.

As shown in FIG. 4B, the projector PR is disposed between the second display device DA2 and the image capture device DCI, behind the first display device DA1 onto whose rear face the light beam emitted from the projector PR with the source image corresponding to the aerial image IA is back-projected at a predetermined incidence. The image capture device DCI is then placed at a sufficient distance from the first display device DA1 not to block the light beam.

In FIGS. 4A and 4B, the second display device DA2 includes for example a flat liquid crystal display screen and displays a background image that for the observer OB underlies the projected aerial image IA. The alternating control device DCA, not represented in FIGS. 4A and 4B, alternates the capture and display of images, coordinating the opaque state of the first display device DA1 with the projection of the source image corresponding to the aerial image IA by the projector PR and the transparent state of the device DA1 with the blocking of the projection of the image IA by the shutter OBT.

According to a third embodiment of the invention shown in FIG. 5, the arrangement of the image capture device DCI, the first display device DA1, the projector PR and the concave mirror MC is symmetrical to the arrangement of FIG. 4A about the observation optical axis between the second display device DA2 and the observer OB. This reversed arrangement is beneficial for reducing the load that the structure of the optical system represents, the weight imposed by the concave mirror MC possibly necessitating an adequate and costly support.

As shown in FIG. 5, a mobile flap VM is placed between the projector PR and the first display device DA1 near the projector and the second display device DA2. The upper portion of the flap VM is moved alternately, in accordance with a predetermined timing, to place an orifice and a reflecting surface represented by a thick black line in FIG. 5 across the light beam projected by the projector PR. The light beam projected toward the front face of the first display device DA1, whose display surface is semi-transparent to form the aerial image IA, passes through the orifice in the flap. The reflecting surface of the flap reflects the light beam emitted by the projector PR so that the light beam is back-projected in the direction of the observation area by the front face of the second display device DA2, whose display surface is also semi-transparent and thus forms the background image.

The FIG. 5 optical system comprises a second image capture device DCI2 located behind the second display device DA2. The device DCI2 has an optical axis colinear with the observation optical axis and a conical field of view in the direction of the local scene.

The alternating control device DCA adjusts the timing of the projector PR to the timing of movement of the flap VM to project alternately a background image onto the second display device DA2 and an aerial image IA onto the plane PI via the first display device DA1. The control device DCA simultaneously controls the display device DA1 to assume the opaque state so that the aerial image IA projected by the projector PR is reflected by it and the display device DA2 to assume the transparent state so that the second image capture device DCI2 captures an image of the local scene superposed on the aerial image IA in accordance with a conical field of view in order to locate the overall position of the observer(s). The control device DCA simultaneously controls the display device DA1 to assume the transparent state so that the first image capture device DCI located behind the display device DA1 captures an image of the local scene in accordance with a cylindrical field of view and the display device DA2 to assume the opaque state so that the background image projected by the projector PR is reflected by it into the background plane in front of the observer OB. When the background image is projected, the image capture device DCI captures a more accurate image of the local scene in accordance with a cylindrical field of view authorizing telecentric shooting.

Figure 6A:
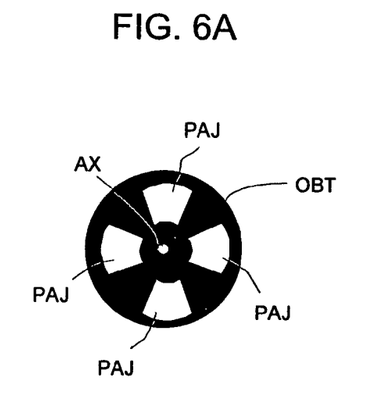
FIGS. 6A, 6B, 6C and 6D are diagrammatic front views of shutters according to the invention.
Figure 6B:
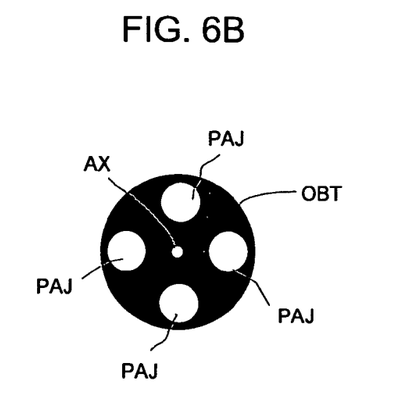
Figure 6C:
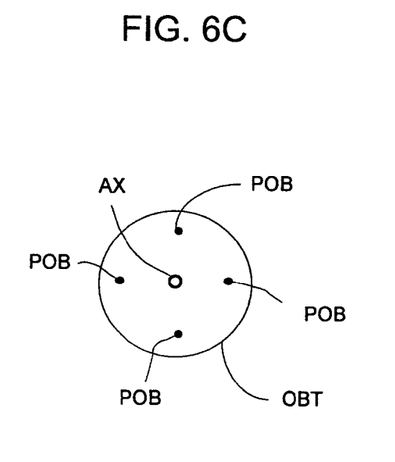
Figure 6D:
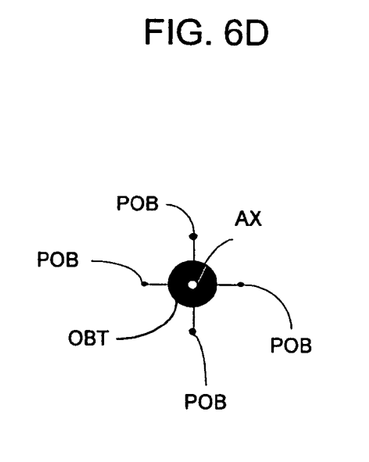
Figure 7A:
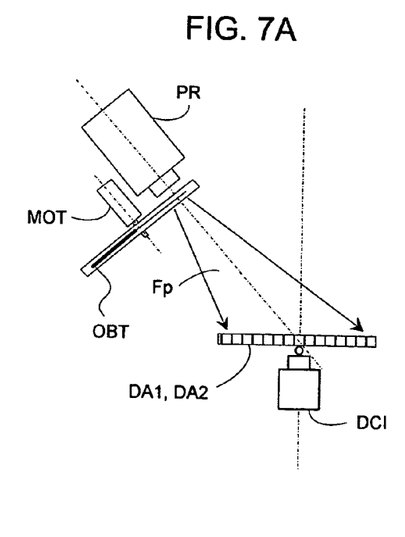
FIGS. 7A, 7B, 7C and 7D are diagrammatic side views of different combinations of projector, display device and image capture device for alternating image capture with image diffusion.

Referring to FIGS. 6A, 6B, 6C and 6D, the shutter OBT comprises a rotary disc that is fixed to the shaft AX of an electric motor MOT shown in FIG. 7A, for example. The disc of the shutter OBT comprises equi-angularly distributed apertured portions PAJ, of which there are four, for example, to allow a light beam to pass, alternating with solid portions, as shown in FIGS. 6A and 6B, or comprises a transparent surface containing equi-angularly distributed shutter portions POB, of which there are four, for example, as shown in FIGS. 6C and 6D. The rotation speed of the motor MOT, and consequently of the shutter OBT, is controlled by means of optoelectronic sensors, for example, or using known stepper motor control techniques.

As shown in FIGS. 6A, 6B and 7A, the shutter OBT has apertured portions PAJ, for example sectors of a ring or circular holes, to allow a light beam Fp emitted by the projector PR and projected onto a translucent type display device DA1 or DA2 to pass through it, for example. The alternating control device DCA, not represented in these figures, alternates image capture and light beam emission by controlling the display device and the motor MOT associated with the shutter OBT in accordance with two phases described hereinafter. In a first phase, the display device assumes an opaque state to display an image projected by the projector that has passed through an aperture portion PAJ of the shutter OBT and in a second phase the display device assumes a transparent state for image capture by the image capture device DCI while the light beam Fp from the projector PR is blocked by a solid portion of the shutter OBT. The alternating control device DCA therefore adjusts the rotation speed of the shutter OBT to coordinate the alternating opaque and transparent states of the display device with the alternation of the apertured and solid portions of the shutter facing the projector. For example, the shutter is turned through one eighth of a revolution when the display device changes state.

Figure 7B:
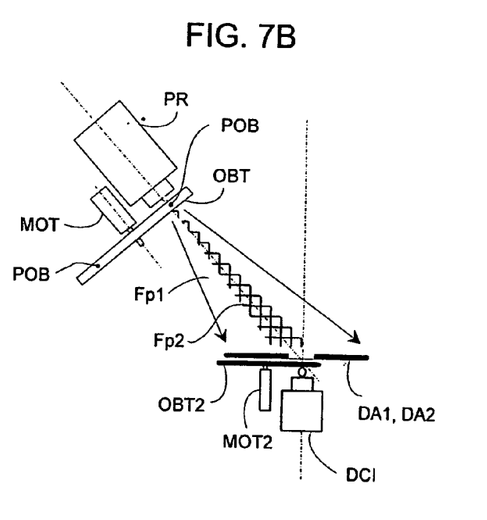

Referring to FIG. 7B, the shutter OBT is associated with the projector PR, as shown in more detail in FIG. 6C or 6D. As shown in detail in FIG. 6A or 6B, another shutter OBT2 is located between the image capture device DCI and the display device DA1 or DA2, which is an opaque disc with a central opening and a conventional display surface. The alternating control device DCA, not represented in FIG. 7B, alternates image capture and light beam emission by controlling the motors MOT and MOT2 associated with the shutters OBT and OBT2, respectively, in accordance with two phases described hereinafter. The projector PR can emit coaxial beams Fp1 and Fp2 of which one beam Fp2 is centered with respect to the other beam Fp1. In a first phase, a solid portion of the shutter OBT2 blocks the central aperture of the display device DA1, DA2 while the projector PR emits beams Fp1 and Fp2 through a transparent portion of the shutter OBT to display a complete image on the display device. In a second phase, an apertured portion PAJ of the shutter OBT2 allows image capture by the image capture device DCI via the aperture at the center of the display device while the projector PR emits only the beam Fp1 through a transparent portion of the shutter OBT to display an incomplete image on the display device, and the beam Fp2 reaching the central aperture of the display device is blocked by a blocking portion POB of the shutter OBT.

The alternating control device DCA, not represented in FIG. 7B, alternates image capture by the image capture device DCI and emission of the light beam by the projector PR via the shutters OBT and OBT2 whose rotation speeds are synchronized by the device DCA. The device DCA is therefore associated with the display device indirectly via the motor MOT2 of the shutter OBT2 associated with the display device.

Figure 7C:
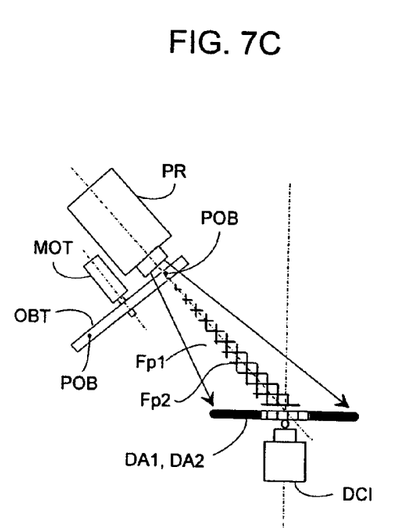

Referring to FIG. 7C, the display device DA1 or DA2 comprises a central translucent screen serving as the shutter OBT2 from FIG. 7B. The translucent screen goes to an opaque state to form a complete image on the display device while the projector PR emits beams Fp1 and Fp2 through a transparent portion of the shutter OBT. The translucent screen goes to a transparent state to authorize image capture by the image capture device DCI while the beam Fp2 emitted by the projector is blocked by a blocking portion POB of the shutter OBT.

Figure 7D:
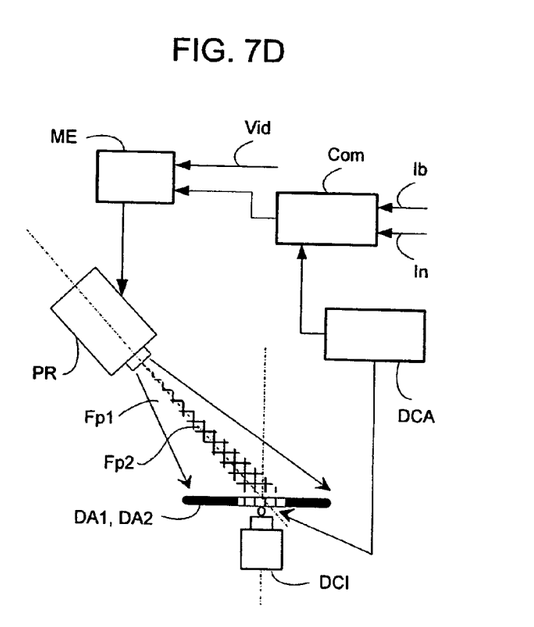

Referring to FIG. 7D, the selective blocking of the beams Fp1 and Fp2 emitted by the projector PR as described with reference to FIG. 7C is effected electronically. A video signal can be connected to a first input Vid of a video mixer ME while a second input of the mixer ME is connected to a switch Com alternately transmitting a "white" image signal Ib corresponding to a high luminance level and a signal of an image In including a central black spot corresponding to a low luminance level. Switching is synchronized with that of the translucent type display device DA1 or DA2 to alternate image capture and image display on a time basis under the control of the alternating control device DCA.

Alternatively, the whole of the display surface of the display device is a translucent type screen and the image In is entirely black so that the projector does not project any light beam onto the display device.

Figure 8:
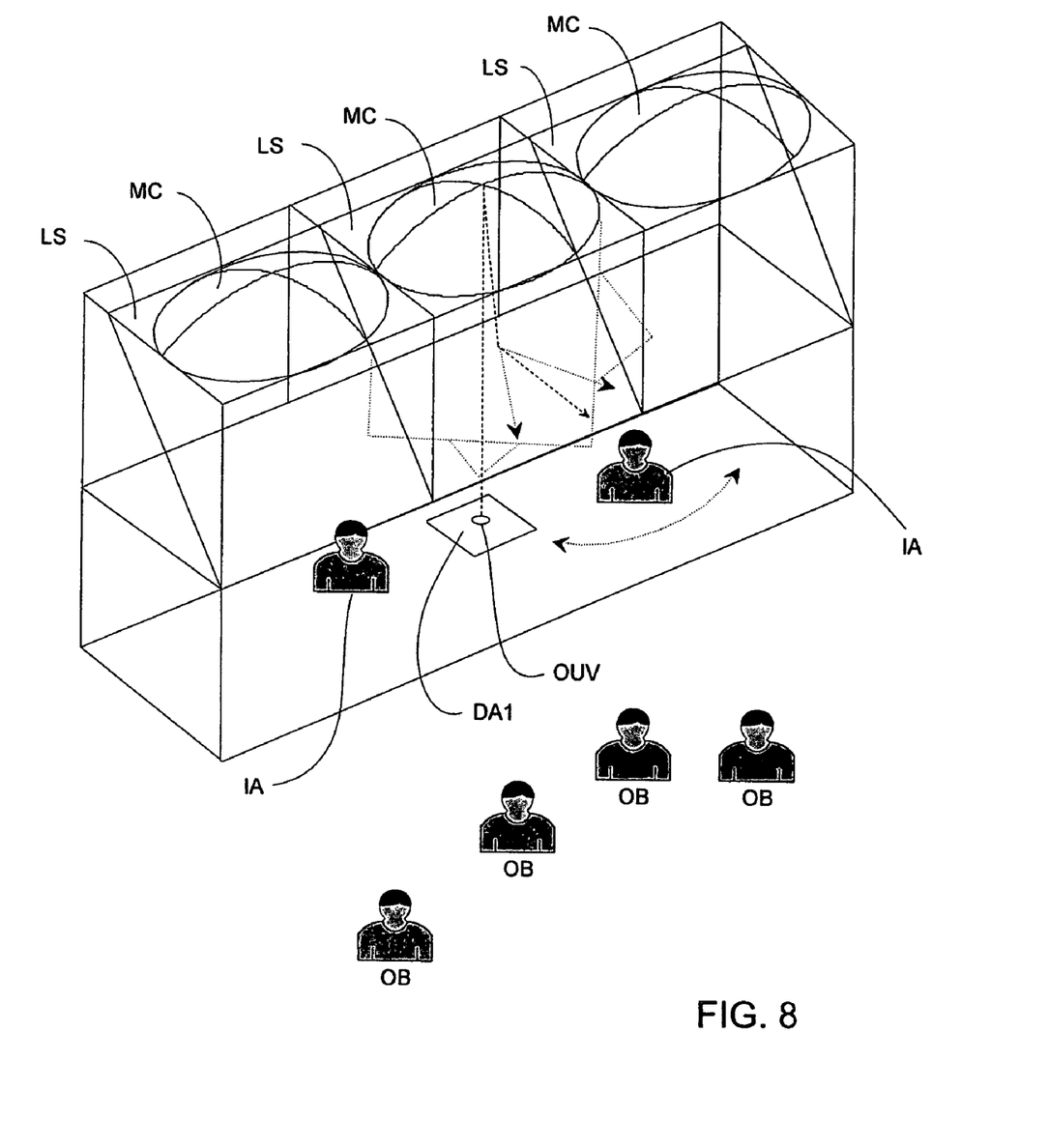
FIG. 8 is a perspective view of three juxtaposed optical systems.

FIG. 8 highlights the modular and compact nature of the optical systems of the invention. For example, three optical systems comprising the same functional means are juxtaposed horizontally for a group of observers OB located in the observation area, such as a local room. Each semi-reflecting plate LS is mobile in order to orient image capture of the local scene and the projection of the aerial image IA, including the silhouette of a distance interlocutor, in the direction of the group of observers. For example, the concave mirror MC is disposed facing the first display device DA1 to display the aerial image IA while an aperture OUV is formed in the first display device for image capture by telecentric shooting.

Figure 9:
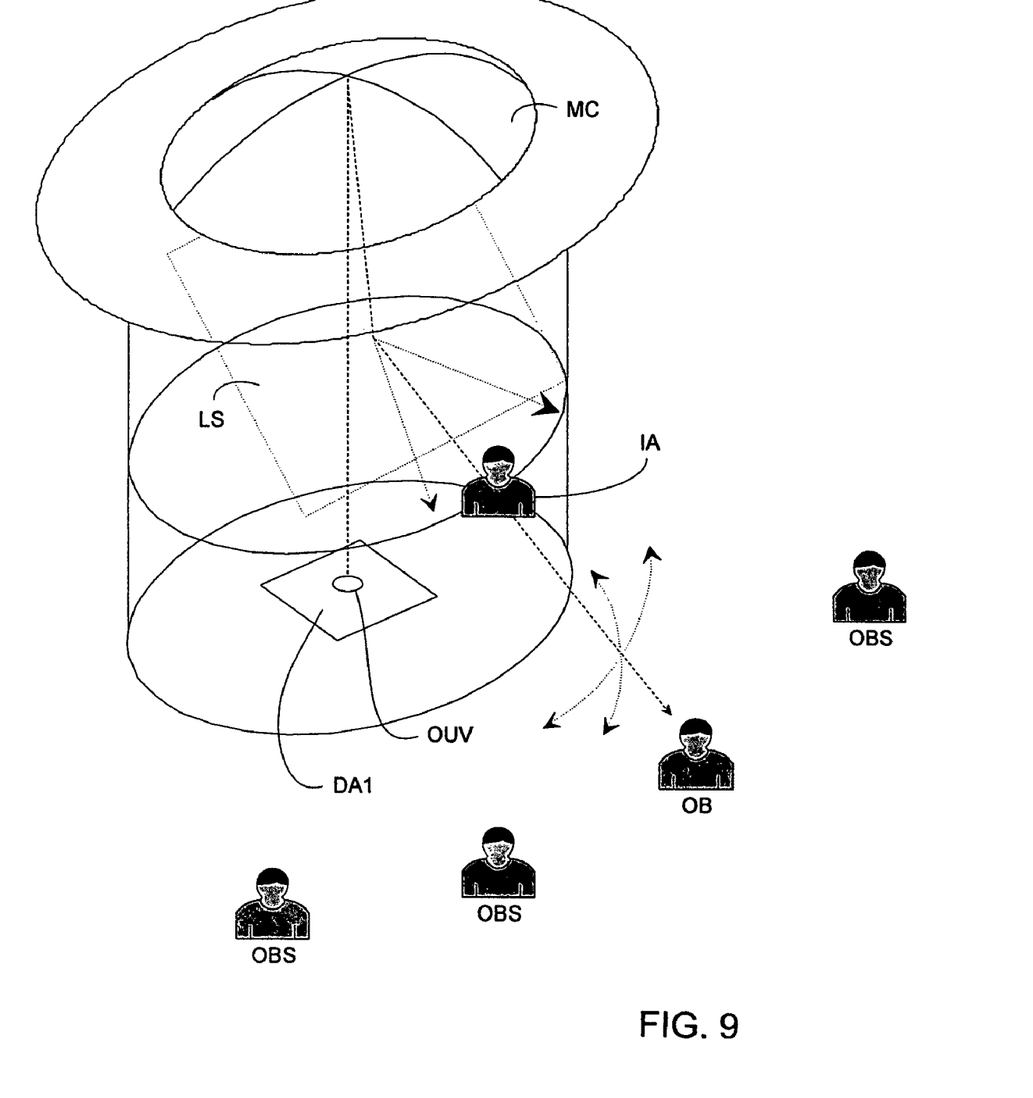
FIG. 9 is a perspective view of an optical system in the form of a cylindrical kiosk.

Referring to FIG. 9, only one optical system is represented in the form of a cylindrical kiosk. The semi-reflecting plate LS is mobile in order to orient the image capture of the local scene and the projection of the aerial image IA according to the direction of the observer OB or an audience consisting of several observers OBS in an observation area.

Initially, the image of each observer OBS in the audience can be captured by standard image capture using a second image capture device DCI2, as shown in FIG. 5, which has a conical field of view to localize a group of persons. The image capture device DCI then captures a more accurate image of the local scene in accordance with a cylindrical field of view and corresponding to telecentric shooting in order to capture only the image of the speaker observer OB in dialog with a speaker participant in the remote scene, said image being displayed by the remote optical system in front of the speaker participant, as in the dual communication system shown in FIG. 2.

Figure 10:
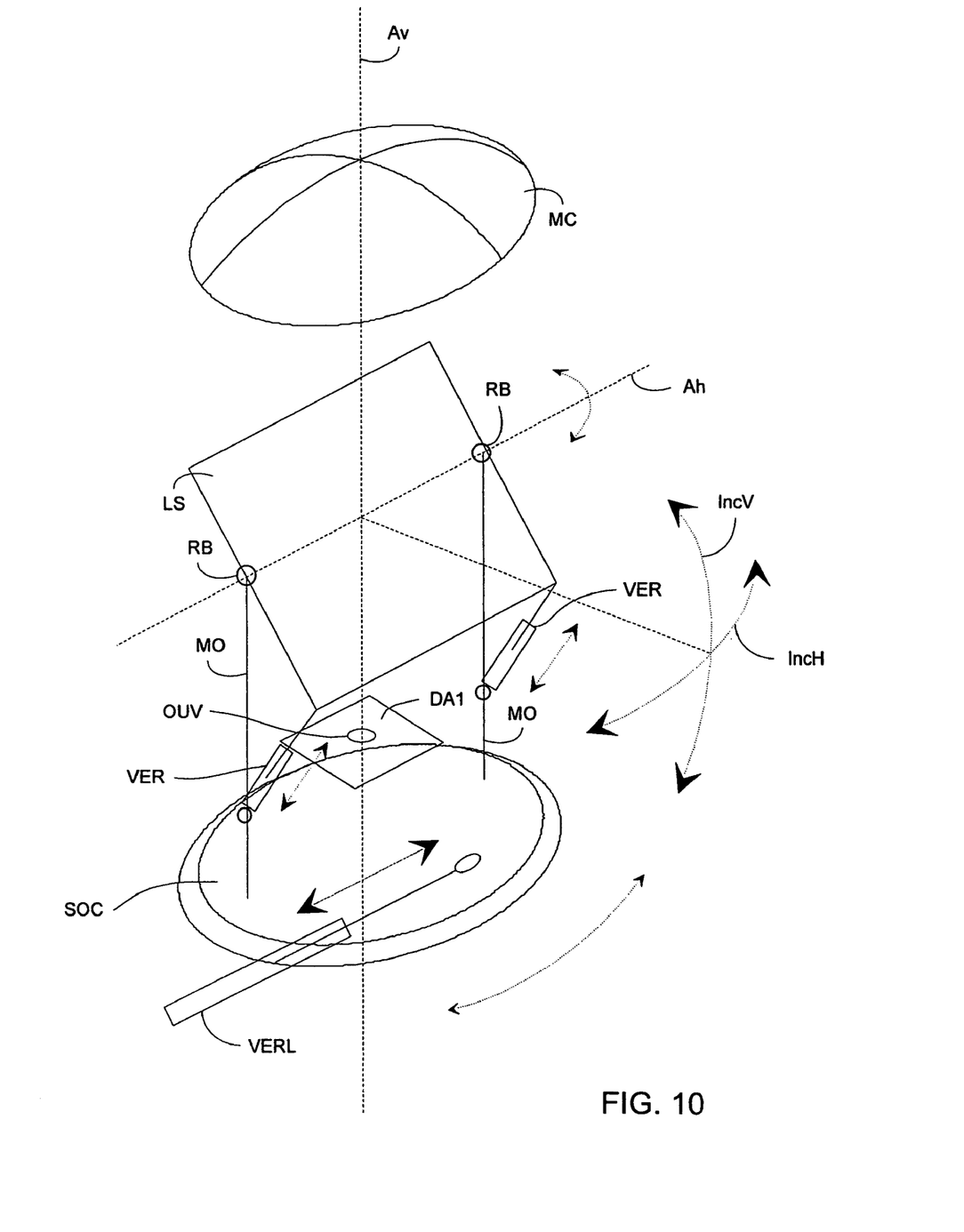
FIG. 10 is a more detailed perspective view of the FIG. 9 optical system.

Referring to FIG. 10, the semi-reflecting plate LS is rotatably mounted about a rotation axis Ah, which is horizontal here, by means of lateral ball bearings RB supported by upper ends of uprights MO fixed to a horizontal base SOC. The plate LS is turned about the rotation axis Ah in accordance with a variable vertical incidence IncV by two parallel actuators VER mounted between the lower ends of the uprights MO and a side of the plate LS parallel to the rotation axis Ah. Moreover, the base SOC is rotatably mounted on a platform resting on the floor about a rotation axis Av, which is vertical here, perpendicular to the rotation axis Ah and centered on the concave mirror MC. The semi-reflecting plate LS supported by the uprights MO is also turned about the rotation axis Av in accordance with a variable horizontal incidence IncH by a lateral actuator VERL mounted between the base SOC and the platform.

The mobility of the semi-reflecting plate LS about perpendicular rotation axes Av and Ah in the manner of a gimbal joint allows image capture of the local scene and display of the aerial image in all directions relative to the observer in accordance with horizontal and vertical incidences IncH and IncV.

The image capture of the local scene and the display of the aerial image are accomplished in two stages:

in a first stage, orientable telecentric shooting is obtained thanks to the mobility of the semi-reflecting plate that is used to point a cylindrical light beam in the direction of the observer, to direct this beam onto the concave mirror MC, and to cause this beam to converge by reflection to a focus of the concave mirror at which the image capture device is located via an aperture OUV provided in the first display device;

in a second stage, the display of the aerial image in all directions is obtained by orienting the semi-transparent plate. To display the aerial image as in FIG. 5, a light beam is projected onto the first display device DA1, which scatters it through the semi-transparent plate in order to be reflected by the concave mirror and directed in the direction of the observer by means of the orientable semi-transparent plate. Orienting the display of the aerial image gives an effect of eye to eye contact which proves beneficial, especially for short or tall persons, persons of restricted mobility or persons with hearing difficulties who use sign language to communicate.

Figure 11:
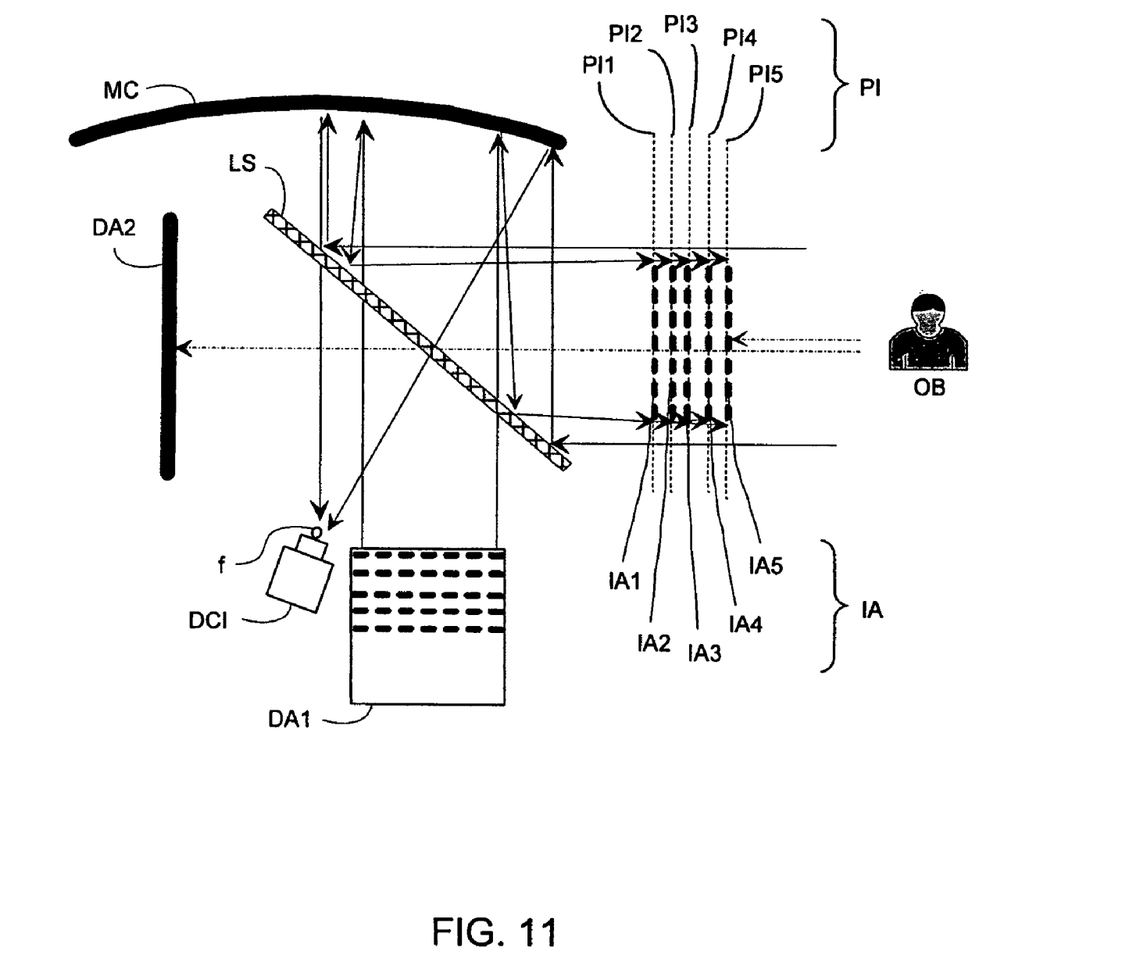
FIG. 11 is a diagrammatic side view of an optical system according to a fourth embodiment of the invention.

According to a fourth embodiment of the invention shown in FIG. 11, an optical system according to the invention displays "holographic" images each consisting of a spatial superposition of close aerial images, for example five such images, using a "volumetric multiplanar" (multilayer) type first display device DA1 located beside the image capture device DCI.

The multiplanar volumetric screen in the optical system produces a perspective effect by superposing two-dimensional aerial images IA1, IA2, IA3, IA4 and IA5 that observers in an observation area perceive in the respective planes PI1, PI2, PI3, PI4 and PI5 of the space.

The invention is not limited to the embodiments described above and variants thereof. Arrangements of certain elements of the optical system described with reference to a particular figure in one embodiment of the invention may be combined with other arrangements according to another embodiment of the invention. For example, the second image capture device DCI2 shown in FIG. 5 can be used in the optical system shown in FIG. 3A. The second image capture device DCI2 is then located in the vicinity of a focus of the concave mirror MC, under the first display device DA1, whose display surface is translucent.

What we claim is:

1. An optical system comprising:
   (a) a first image capture device for capturing an image of an observation area,
   (b) a first display device,
   (c) a semi-reflecting plate,
   (d) a concave mirror disposed facing said first display device,
   (e) a second display device for displaying a background image, a light beam being scattered by said first display device through said semi-reflecting plate and then reflected by said concave mirror and said semi-reflecting plate in order to display an aerial image between said semi-reflecting plate and said observation area,
   (f) a projector adapted to project a light beam toward one of said first display device and second display device, said first image capture device being adapted to capture an image of said observation area through said one display device, and
   (g) means for alternating capture of said image of said observation area by said first image capture device and projection of the light beam projected by said projector.

2. A system as claimed in claim 1, wherein said first image capture device is located behind said second display device and has a conical field of view in the direction of said aerial image and said observation area.

3. A system as claimed in claim 1, wherein said first image capture device is located behind said first display device near a focus of said concave mirror, and forms with said concave mirror and said semi-reflecting plate a telecentric optical assembly the field of view whereof is cylindrical in the direction of said aerial image and said observation area.

4. A system as claimed in claim 1, comprising a second image capture device located behind said second display device, said first image capture device being located behind said first display device in the vicinity of a focus of said concave mirror.

5. A system as claimed in claim 1, wherein the display device behind which said first image capture device is located, is semi-transparent.

6. A system as claimed in claim 1, wherein one of said first display device and second display device is adapted to be sometimes at a translucent state, sometimes at a transparent state.

7. A system as claimed in claim 1, wherein said first display device and second display device have perpendicular optical axes, said second display device displays said background image in a background plane, and said first display device displays said aerial image in a foreground plane by reflection onto said semi-reflecting plate in the direction of said observation area.

8. A system as claimed in claim 1, and further including:
   (h) means for rotating said semi-reflecting plate about two rotation axes (Ah, Av) that are perpendicular to each other.

9. A system as claimed in claim 1, wherein said alternating means controls one of the first display device and second display device to assume an opaque state and projection of said light beam projected by said projector onto said one display device, and controls said one display device to assume a transparent state and suppression of the projected light beam in order for said first image capture device to capture an image of said observation area.

10. A system as claimed in claim 1, and further including:
    (h) a shutter controlled by the alternating means and having:
        (1) at least one aperture portion, through which said light beam projected by said projector passes toward said display device, behind which said first image capture device is located to display one of said aerial image and background image with no image capture of said observation area, and (2) at least one solid portion blocking the projected light beam to capture an image of said observation area.

11. A system as claimed in claim 1, and further including:

(h) a mobile flap placed in the vicinity of said projector and of one of said first display device and second display device and controlled by said alternating means, said mobile flap including an orifice adapted to be passed by said light beam projected by said projector toward the other of said first display device and second display to display one of said aerial image and background image and a reflecting surface adapted to reflect the projected light beam to back-project it onto one of said first display device and second display that is adapted to display the other of said aerial image and background image.

12. A communication system including optical systems located in a local scene and a remote scene, respectively, each of said two optical systems comprising:

(a) a first image capture device for capturing an image of an observation area, (b) a first display device, (c) a semi-reflecting plate, (d) a concave mirror disposed facing said first display device, (e) a second display device for displaying a background image, a light beam being scattered by said first display device through said semi-reflecting plate and then reflected by said concave mirror and said semi-reflecting plate in order to display an aerial image between said semi-reflecting plate and said observation area, (f) a projector adapted to project a light beam toward one of said first display device and second display device, said first image capture device being adapted to capture an image of said observation area through said one display device, and (g) means for alternating capture of said image of said observation area by said first image capture device and projection of the light beam projected by said projector, (g) the aerial image displayed in one of said two optical systems corresponding to the observation area image captured by the first image capture device of the other of said two optical systems.

* * * * *